US008523291B2

(12) United States Patent
Urgu (10) Patent No.: US 8,523,291 B2
(45) Date of Patent: Sep. 3, 2013

(54) COMPACTOR WHEEL TIP

(75) Inventor: Vinayak R. Urgu, Sugar Grove, IL (US)

(73) Assignee: Caterpillar Inc., Peoria, IL (US)

( * ) Notice: Subject to any disclaimer, the term of this patent is extended or adjusted under 35 U.S.C. 154(b) by 230 days.

(21) Appl. No.: 13/050,075

(22) Filed: Mar. 17, 2011

(65) Prior Publication Data

US 2011/0227399 A1    Sep. 22, 2011

Related U.S. Application Data

(60) Provisional application No. 61/315,487, filed on Mar. 19, 2010, provisional application No. 61/315,896, filed on Mar. 19, 2010.

(51) Int. Cl.
  *B60B 15/00*    (2006.01)
(52) U.S. Cl.
  USPC ............................................ 301/43; 301/44.3
(58) Field of Classification Search
  USPC ......................................... 301/43, 44.3, 44.4
  See application file for complete search history.

(56) References Cited

U.S. PATENT DOCUMENTS

| 5,687,799 | A  | 11/1997 | Greenfield et al. |
| 5,769,507 | A  | 6/1998  | Brockway |
| 5,951,123 | A  | 9/1999  | Bomstad et al. |
| 5,967,242 | A  | 10/1999 | Caron et al. |
| 6,042,192 | A  | 3/2000  | Brockway |
| 6,273,516 | B1 | 8/2001  | Brockway |
| 6,322,170 | B1 | 11/2001 | Knell et al. |
| 6,991,401 | B1 | 1/2006  | Caron |
| 2004/0012244 | A1 | 1/2004 | Waterman et al. |
| 2006/0244311 | A1 | 11/2006 | Brockway |
| 2007/0280783 | A1 | 12/2007 | Gibbins et al. |

FOREIGN PATENT DOCUMENTS

| DE | 2236607      | 2/1974  |
| EP | 08756229 A2  | 4/1998  |
| EP | 8756529      | 11/1998 |
| JP | 10095201     | 4/1998  |

OTHER PUBLICATIONS

Declaration of Hans-Hermann Habenicht signed Jan. 18, 2010; 8 pages.
HANOMAG Compaktor CL240, Exhibit A to Habenicht Declaration, Jan. 1994; 8 pages.
HANOMAG Compaktor CL240—English translation, 9 pages.
KOMATSU HANOMAG Parts Book CL310, Exhibit B to Habenicht Declaration, Apr. 1994; 8 pages.
HANOMAG brochure, Apr. 1994; 20 pages.
HANOMAG Compaktor CL240, Mar. 1995, 3 pages.
HANOMAG Compaktor CL66, Nov. 1990, 6 pages.
HANOMAG Compaktor CD 230, Jan. 1994, 8 pages.
HANOMAG Compaktor CD 230—English translation, 8 pages.
HANOMAG Compaktor CL290, Jun. 1991, 8 pages.
HANOMAG brochure, Jun. 1990, 16 pages.
HANOMAG CL290 Parts Book, Dec. 1991, 6 pages.

(Continued)

*Primary Examiner* — Jason Bellinger
*Assistant Examiner* — Jean Charleston
(74) *Attorney, Agent, or Firm* — Miller, Matthias & Hull (57) ABSTRACT

A tip for use with a wire guard system for a compactor wheel includes a base portion and a wear portion attached to and extending from the base portion. A first groove is disposed at the wear portion and shaped to receive an end portion of a first wire guard section. A second groove is disposed at the wear portion and shaped to receive an end portion of a second wire guard section.

20 Claims, 6 Drawing Sheets

(56) References Cited

OTHER PUBLICATIONS

HANOMAG CL240 photograph, no date, 1 page.
HANOMAG brochure, May 1994, 18 pages.
The CARON Wire Safeguard Group brochure, no date, 1 page.
HANOMAG Compaktor C 55 D, no date, 6 pages.
HANOMAG Compaktor CL280, no date, 8 pages.
HANOMAG Compaktor CL 310, Mar. 1994, 8 pages.
Junior Party Greenfield's List of Proposed Motions filed in Patent Interference No. 105,806, 4 pages.
Senior Party Brockway's List of Proposed Motions filed in Patent Interference No. 105,806, 6 pages.
Junior Party Greenfield's Response to Order filed in Patent Interference No. 105,806, 4 pages.
Senior Party Brockway's Proposed Unpatentability Motion filed in Patent Interference No. 105,806, 4 pages.
Senior Party Brockway's Substantive Motion 1 filed in Patent Interference No. 105,806, 51 pages.
Senior Party Brockway's Substantive Motion 2 filed in Patent Interference No. 105,806, 20 pages.
Declaration of Interference filed in Patent Interference No. 105,806, 48 pages.
Board Order—Motion Times issued in Patent Interference No. 105,806, 8 pages.
Greenfield Response to Order filed in Patent Interference No. 105,806, 4 pages.
Board Order issued in Patent Interference No. 105,806, 3 pages.
Brockway Request for Rehearing filed in Patent Interference No. 105,806, 10 pages.
Brockway Exhibit List filed in Patent Interference No. 105,806, 3 pages.
Decision—Brockway Request for Rehearing issued in Patent Interference No. 105,806, 6 pages.
Brockway Response to Board Order filed in Patent Interference No. 105,806, 3 pages.
Greenfield Request for Adverse Judgment filed in Patent Interference No. 105,806, 3 pages.
Board Order—Miscellaneous issued in Patent Interference No. 105,806, 3 pages.
Greenfield Response to Miscellaneous Order filed in Patent Interference No. 105,806, 3 pages.
Board Order Vacating Times issued in Patent Interference No. 105,806, 2 pages.
Komatsu Parts Book for CL310 (Nov. 1995).
Al-Jon Brochure for Advantage Landfill Compactor 600.

COMPACTOR WHEEL TIP

CROSS-REFERENCE TO RELATED APPLICATION

This is a non-provisional application claiming priority under 35 USC §119 (e) to U.S. Provisional Patent Application Nos. 61/315,487 and 61/315,896, both filed on Mar. 19, 2010.

TECHNICAL FIELD

This invention relates generally to a compactor wheel tip for use in a wire guard system.

BACKGROUND

Wheeled compactors may be used in harsh applications, such as garbage compaction, Garbage compaction and handling can be a particularly harsh environment because wire, carpet, magnetic tape, rebar and the like, generally referred to herein as "wire," may be distributed throughout a waste processing site or landfill and can become wrapped around the axles of the wheeled compactor causing the machine to stall or become disabled. To prevent this, wire guard systems, also known as axle guard systems, have been developed.

For example, U.S. Pat. No. 5,769,507 describes an axle guard that includes at least one circumferential barrier extending above the rim and adjacent the inner circumferential edge of the rim. Similarly, Hanomag has sold a wire guard system that includes a plurality of tips attached around a wheel with metal plates disposed between the tips to form an annular barrier, However, it has been discovered by the Applicant that a gap between components of a wire guard system can engage and may encourage wire to wrap up around the wire guard system and the axle.

The present invention is directed to overcome one or more of the problems as set forth above.

SUMMARY OF THE INVENTION

In one aspect of the present invention, a tip for use with a wire guard system for a wire guard system is provided. The tip may include a base portion and a wear portion portion and shaped to receive an end portion of a first wire guard section. A second groove is disposed at the wear portion and shaped to receive an end portion of a second wire guard section.

In another aspect, a tip may include a base portion and a wear portion attached to and extending from the base portion. The wear portion includes a first side and a second side disposed opposite the first side. A first groove is disposed at the first side and shaped to receive an end portion of a first wire guard section. A second groove is disposed at the second side and shaped to receive an end portion of a second wire guard section.

Another aspect that may be combined with any aspects herein, the tip may include a central vertical axis with the second groove disposed about one hundred eighty degrees from the first groove about the central vertical axis.

Another aspect that may be combined with any aspects herein, the first and second grooves may only be disposed at the wear portion.

Another aspect that may be combined with any aspects herein, the first and second grooves may extend from the wear portion into the base portion.

Another aspect that may be combined with any aspects herein, the first and second grooves may extend into the wear portion.

Another aspect that may be combined with any aspects herein, the first groove may be defined by a first guide wall extending from the wear portion and a second guide wall spaced from the first guide wall and extending from the wear portion.

Another aspect that may be combined with any aspects herein, the first guide wall and the second guide wall may be attached to the base portion.

Another aspect that may be combined with any aspects herein, the first guide wall and the second guide wall may be connected by a base wall with the first guide wall, the second guide wall, and the base wall being unitarily formed and having a U shaped cross section.

Another aspect that may be combined with any aspects herein, the base wall, the first guide wall, and the second guide wall may be made of low-carbon steel.

Another aspect that may be combined with any aspects herein, the base portion may be made of low-carbon steel and the wear portion may be made of high-carbon steel.

Another aspect that may be combined with any aspects herein, the base portion and the wear portion are unitarily formed.

Another aspect that may be combined with any aspects herein, the first groove and the second groove may each have an entirely flat bottom surface.

Additionally, in another aspect that may be combined with any aspects herein, a wire guard system may include a tip and a wire guard section including a first tongue disposed at a first end, the first tongue being shaped to fit within at least a respective one of the first and second grooves of the tip.

Another aspect that may be combined with any aspects herein, the wire guard section may have an inverted "Y" shaped cross section.

Another aspect that may be combined with any aspects herein, the first groove may have an inverted "Y" shaped cross section.

DETAILED DESCRIPTION

Figure 1:
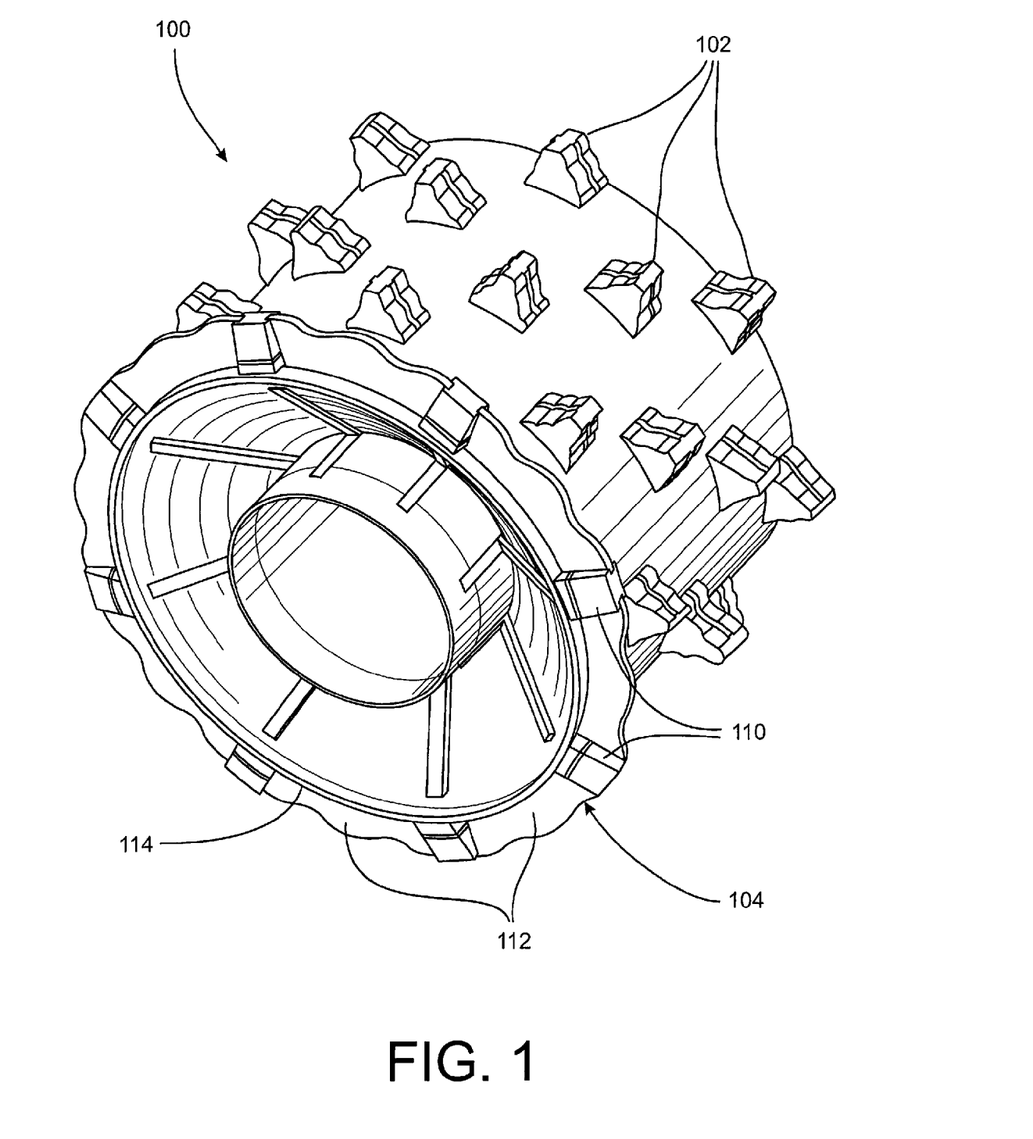
FIG. 1 is a perspective view of a compactor wheel including a plurality of tips and a wire guard system.

Referring to FIG. 1, a perspective view illustrates a compactor wheel 100 for use with wheeled compactors includes a plurality of tips 102 and a wire guard system 104. As shown, the wire guard system 104 includes a plurality of tips 110 separated by wire guard segments 112 that together form an annular barrier. The wire guard system as shown may be disposed proximate an inner axial side 114 of the wheel 100.

Figure 2:
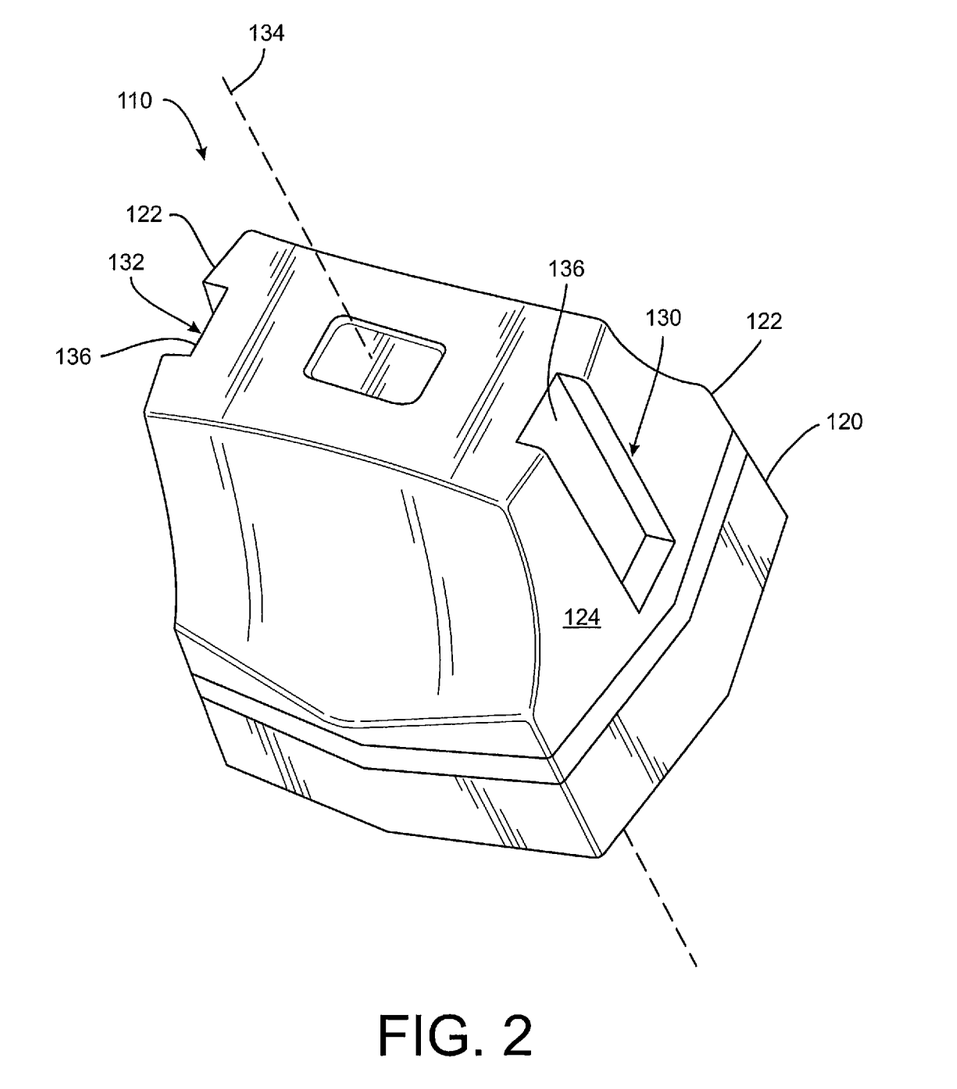
FIG. 2 is a perspective view of the tip of the wire guard system of FIG. 1 shown in isolation.

Referring to FIG. 2, a perspective view illustrates the tip 110 of the wire guard system 104 of FIG. 1 in isolation. As shown, the tip 110 includes a base portion 120. In some configurations, the base portion 120 may be made of an easily weldable material, such as low-carbon steel or other alloy, in order to facilitate welding of the tip 110 to the wheel 100. In some configurations, the base portion 120 may also be hollow with a chamfered bottom edge to facilitate welding to the wheel 100.

The tip 110 further includes a wear portion 122 attached to and extending from the base portion 120. The wear portion 122 may be made of a wear resistant material such as high-carbon steel or other alloy. In this configuration, the wear portion 122 and the base portion 120 may be brazed, friction-stir welded, or welded together to preserve the wear resistance of the wear portion 122 while providing a more weldable material in the base portion 120 for attachment to the wheel 100. Alternatively, the wear portion 122 and the base portion 120 may be integrally formed meaning forged or cast as a single unitary piece.

The wear portion 122 may include a first side 124 and a second side 126 disposed opposite the first side 124. A first groove 130 is positioned at the first side 124 and is shaped to receive an end portion of a wire guard segment 112. A second groove 132 is positioned at the second side 126 and is shaped to receive an end portion of another wire guard segment 112 in the same manner as the first groove 130.

In some configurations, the tip 110 may include a central vertical axis 134 such that the second groove 132 is disposed about one hundred eighty degrees from the first groove 130 about the central vertical axis 134. As shown, the first and second grooves 130, 132 may extend into the wear portion 122 and may each have a generally flat bottom surface 136. The generally flat bottom surface 136 may facilitate match up between a tongue of a wire guard segment 112 and the tip 110, as well as, installation and repair in that a wire guard segment 112 may require cutting during installation and a straight flat tongue is easier than a curvy tongue.

Further, the first and second grooves 130, 132 in this configuration are positioned only on the wear portion 122. Alternatively, the first and second grooves 130, 132 may extend the height of the tip 110.

Figure 3:
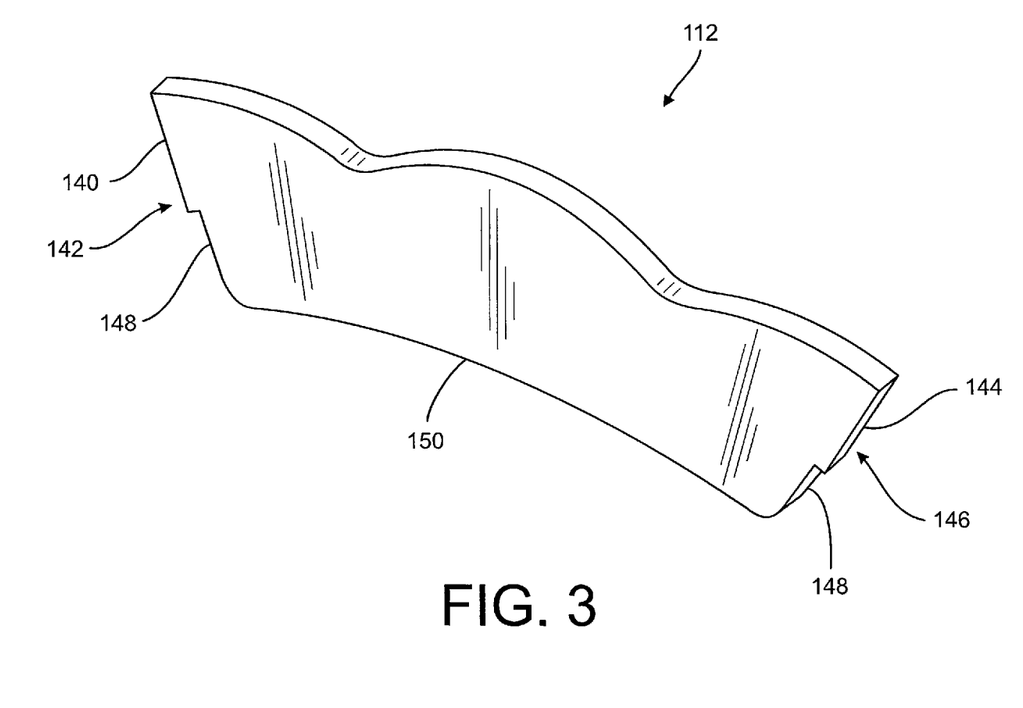
FIG. 3 is a perspective view of a wire guard segment of the wire guard system of FIG. 1 shown in isolation.

Referring to FIG. 3, a perspective view illustrates a wire guard segment 112 of the wire guard system 104 of FIG. 1 is shown in isolation. As shown, the wire guard segment 112 includes a first tongue 140 disposed at a first end 142 and a second tongue 144 disposed at the second end 146. Bottom portions 148 disposed at the first and second ends 142, 146 may extend below the tongues 140, 144. The first and second tongues 140, 144 may have a wide variety of profiles. In some configurations, the bottom portions 148 may not exist.

In this configuration, the first and second tongues 140, 144 are shaped to engage only a wear portion 122 of the tip 110. In some configurations, this may be useful in that the first and second tongues 140, 144 can engage respective grooves 130, 132 in the wear portions 122 of tips 110 so that welding is not required between the wear portions 122 and the tongues 140, 144. Further, bottom portions 148 of the wire guard segment 112 may be welded to the base portions 120 of tips 110. Thus, the effects from welding on the wear portions 122 may be minimized.

When installed on the wheel 100, the base 150 of the wire guard segments 112 may be welded to the wheel 100.

Figure 4:
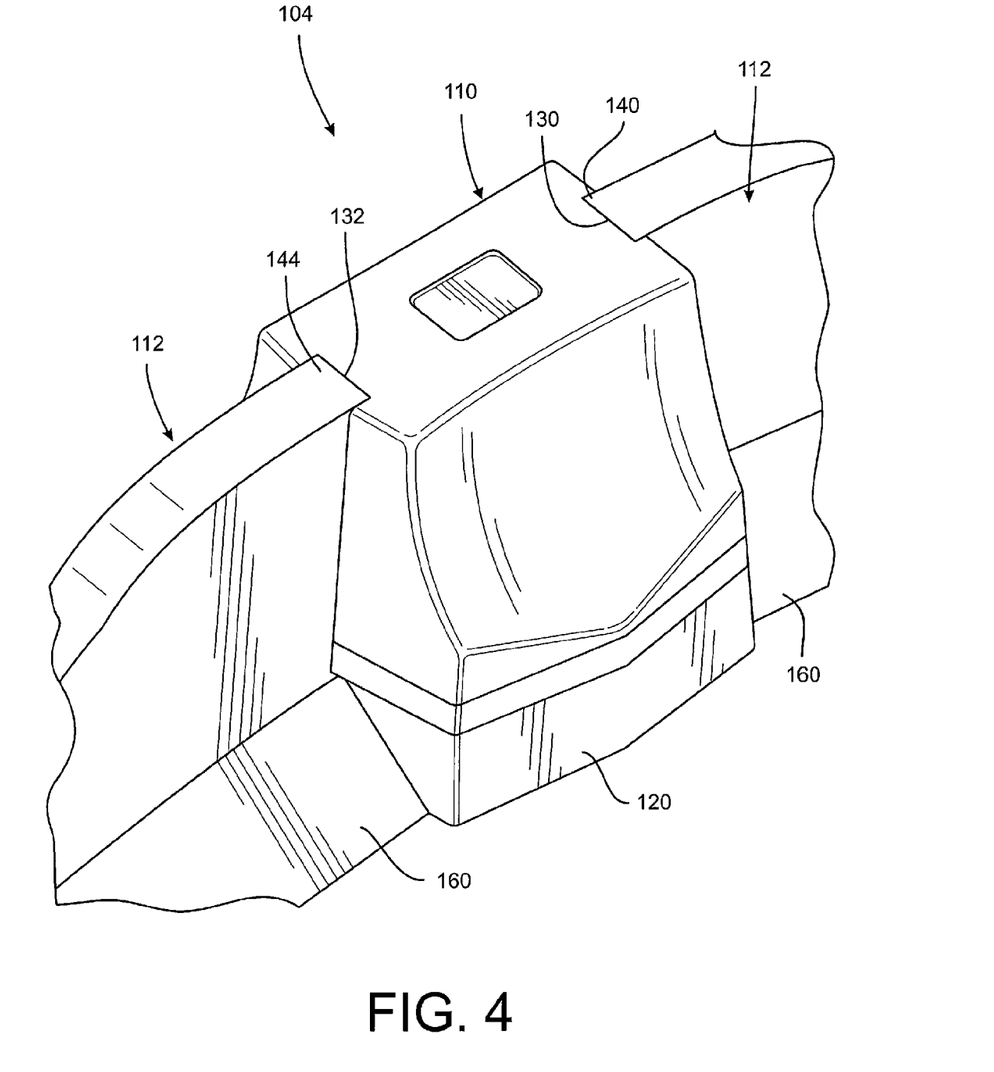
FIG. 4 is a perspective view of wire guard segments and a tip of the wire guard system assembled together.

Referring to FIG. 4, a perspective view illustrates the fit up between the wire guard segments 112 and the tip 110 of the wire guard system 104. The tongues 140, 144 of the wire guard segments 112 are engaged with the grooves 130, 132 of the tip 110 to minimize separation and thus, the formation of a gap between the wire guard segments 112 and the tip 110.

As shown, optional brace members 160 may be disposed adjacent the base portion 120 of the tip 110 and the base 150 of the wire guard segments 112. The brace members 160 may be welded to the base portion 120 of the tip 110 and the base 150 of the wire guard segments 112 to provide lateral support to the wire guard system 104.

Figure 5:
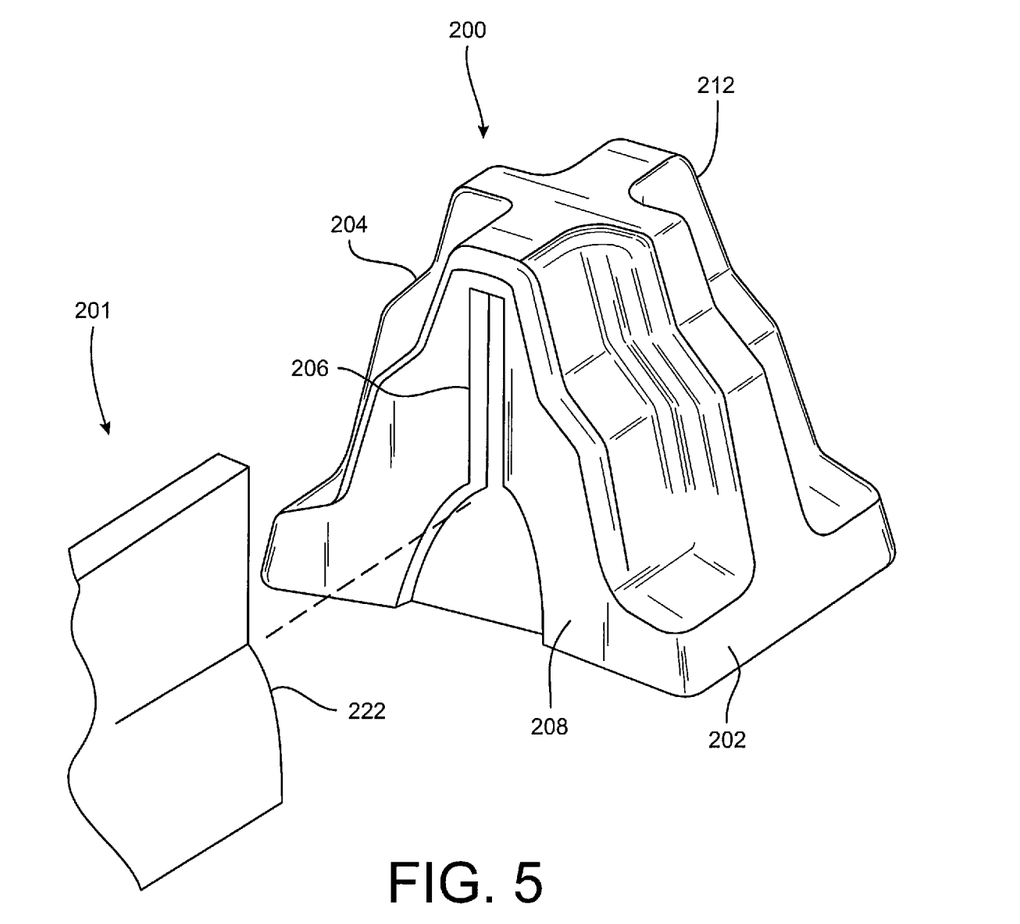
FIG. 5 is a perspective view of another configuration of a tip of a wire guard system.

FIG. 5 is a perspective view of another configuration of a tip 200 and a wire guard segment 201. The tip 200 is integrally formed meaning forged or cast as a single unitary piece. The tip 200 includes a base portion 202 and a wear portion 204. As shown, a first groove 206 is disposed on a first side 208 of the base portion 202 and the wear portion 204. A similar second groove (not shown) is disposed on a second side 212 of the base portion 202 and the wear portion 204.

As shown, the first groove 206 extends from the base portion into the wear portion to a height of a wire guard segment 201 and provides a matching fit for the wire guard segment 201. Thus, loads on the wire guard segment 201 may be transferred to the tip 200 through the first groove 206 with or without welding the tip 200 and the wire guard segment 201 together. In this configuration, the tongue 222 includes the entire cross sectional profile of the wire guard segment 201.

Figure 6:
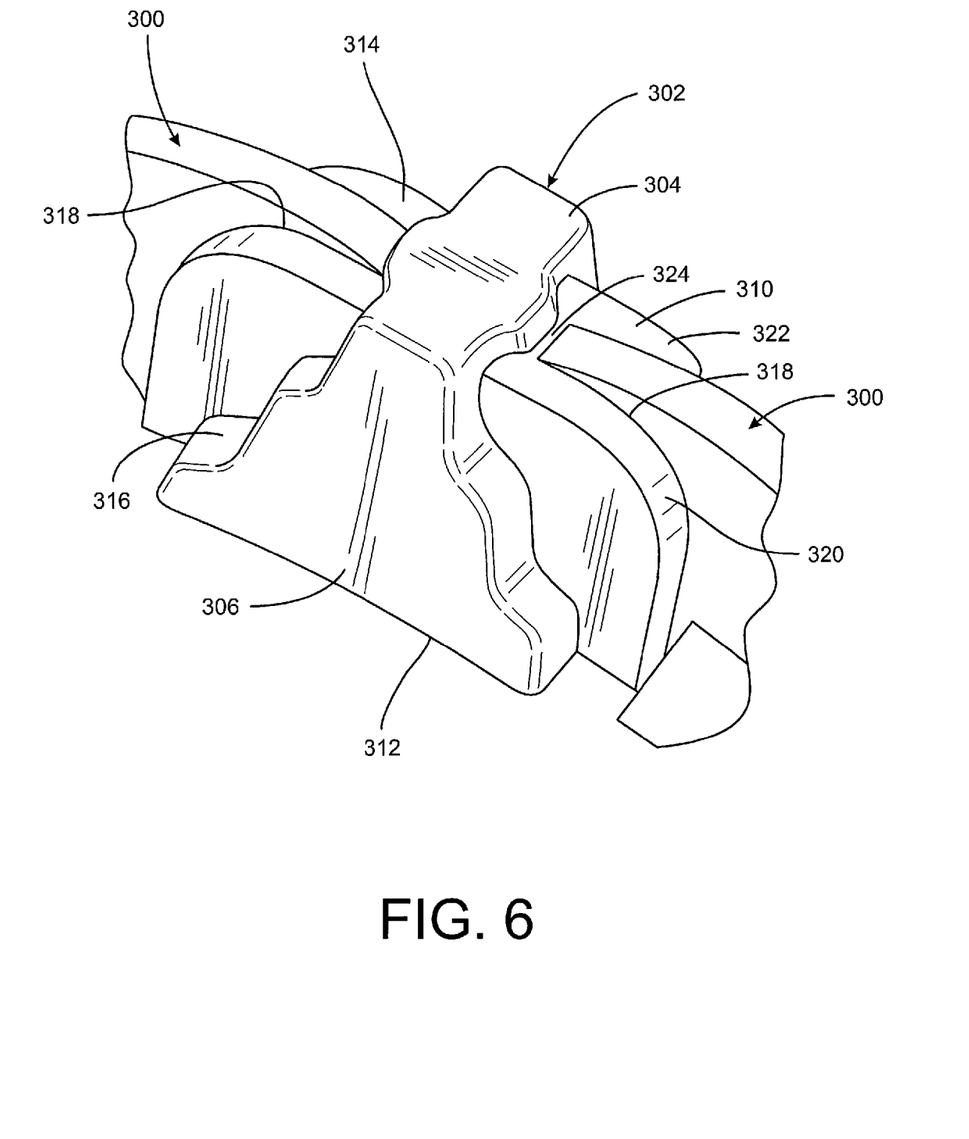
FIG. 6 is a perspective view of another configuration of segments and a tip of a wire guard system.

Referring to FIG. 6, a perspective view illustrates another configuration of wire guard segments 300 and a tip 302. As shown, the tip 302 ha a profile similar to the tip of FIG. 5, however without a groove. The tip 302 includes a wear portion 304 and a base portion 306.

In this configuration, a first groove insert 310 is disposed on a first side 312 of the tip 302 and a second groove insert 314 is disposed on a second side 316 of the tip 302. As shown, the first and second groove inserts 310, 314 conform to the outer profile of the tip 302 in order to engage and abut the respective first and second sides 312, 316.

The first and second groove inserts 310, 314 each include a groove 318 defined by a first guide wall 320 extending from the wear portion 304 of the tip 302 and a second guide wall 322 spaced from the first guide wall 320 and extending from the wear portion 304 of the tip 302. The first and second guide walls 320, 322 may be connected by a base wall 324 with the first and second guide walls 320, 322, and the base wall 324 being integrally formed. The first and second guide walls 320, 322, and the base wall 324 may cooperate to form a "U" shaped cross section of the groove 318.

In some configurations, the first and second guide walls 320, 322 may be attached to the base portion 306 and may be made of an easily weldable material such as low-carbon steel or other alloy.

INDUSTRIAL APPLICABILITY

In general, any compactor wheel tip may be used in the wire guard system disclosed herein. As noted in the background section, gaps between the wire guard sections and the tips may permit wire to be engaged in the gap and retained on the wheel. In order to prevent such gaps from forming between the tips and the wire guard sections of the wire guard system, a groove disposed in at least the wear portion of a tip may be provided permitting a tongue extending from at least an upper portion of a wire guard section to engage and be retained in the groove. Thus, the gap is prevented even if the tongue and the wear portion are not welded together, but only abut each other.

Alternatively, if the tongue and the wear portion are welded together, the groove may provide further strength to the interface between the tongue and the wear portion.

In configurations were providing a groove in the wear portion is not preferred, a groove insert may be provided to abut against the tip and provide a groove for receipt and retention of the tongue of a wire guard section.

Further, the groove may be made to receive the entire profile of the wire guard section and thus, may have similar cross section. For example, if the tongue of the wire guard section includes the entire cross section of the wire guard section, which is an inverted "Y," the groove for that configuration may also have an inverted "Y" cross section.

What is claimed is:

1. A tip for use with a wire guard system for a compactor wheel, the tip comprising:
   a base portion;
   a wear portion attached to and extending from the base portion;
   a first groove disposed at the wear portion and shaped to receive an end portion of a first wire guard section; and
   a second groove disposed at the wear portion and shaped to receive an end portion of a second wire guard section.

2. The tip of claim 1, further comprising a central vertical axis, wherein the second groove is disposed about one hundred eighty degrees from the first groove about the central vertical axis.

3. The tip of claim 1, wherein the first and second grooves are only disposed at the wear portion.

4. The tip of claim 1, wherein the first and second grooves extend from the wear portion into the base portion.

5. The tip of claim 1, wherein the first and second grooves extend into the wear portion.

6. The tip of claim 1, wherein the first groove is defined by a first guide wall extending from the wear portion and a second guide wall spaced from the first guide wall and extending from the wear portion.

7. The tip of claim 6, wherein the first guide wall and the second guide wall are attached to the base portion.

8. The tip of claim 6, wherein the first guide wall and the second guide wall are connected by a base wall, the first guide wall, the second guide wall, and the base wall being unitarily formed and having a U shaped cross section.

9. The tip of claim 8, wherein the base wall, the first guide wall, and the second guide wall are made of low-carbon steel.

10. The tip of claim 1, wherein the base portion is made of low-carbon steel and the wear portion is made of high-carbon steel.

11. The tip of claim 1, wherein the base portion and the wear portion are unitarily formed.

12. The tip of claim 1, wherein the first groove and the second groove each have a flat bottom surface.

13. A tip for use with a wire guard system for a compactor wheel, the tip comprising:
    a base portion;
    a wear portion attached to and extending from the base portion, the wear portion including a first side and a second side disposed opposite the first side;
    a first groove disposed at the first side and shaped to receive an end portion of a first wire guard section; and
    a second groove disposed at the second side and shaped to receive an end portion of a second wire guard section.

14. The tip of claim 13, wherein the first and second grooves are only disposed at the wear portion.

15. The tip of claim 14, wherein the first and second grooves extend from the wear portion into the base portion.

16. The tip of claim 15, wherein the first and second grooves extend into the wear portion.

17. The tip of claim 16, wherein the first groove is defined by a first guide wall extending from the wear portion and a second guide wall spaced from the first guide wall and extending from the wear portion.

18. The tip of claim 16, wherein the first guide wall and the second guide wall are attached to the base portion.

19. The tip of claim 16, wherein the first guide wall and the second guide wall are connected by a base wall, the first guide wall, the second guide wall, and the base wall being unitarily formed and having a U shaped cross section.

20. A wire guard system for a compactor wheel, the wire guard system comprising:
    a tip including a base portion and a wear portion attached to and extending from the base portion, the wear portion including a first side and a second side disposed opposite the first side, the tip further including a first groove disposed on and extending into the first side and a second groove disposed on and extending into the second side; and
    a first wire guard section including a first tongue disposed at a first end and a second tongue disposed at a second end, the first tongue being shaped to fit within at least a respective one of the first and second grooves of the tip.

* * * * *